(12) United States Patent
Takada et al.

(10) Patent No.: US 6,737,187 B2
(45) Date of Patent: May 18, 2004

(54) CLOSED BATTERY

(75) Inventors: Akiyoshi Takada, Shiga-ken (JP);
Kinji Saijo, Yamaguchi-ken (JP);
Kazuo Yoshida, Yamaguchi-ken (JP);
Nobuyuki Yoshimoto, Yamaguchi-ken
(JP); Yoshihiko Isobe, Yamaguchi-ken
(JP)

(73) Assignees: Toyo Kohan Co., Ltd., Tokyo (JP);
**Fukuda Metal Foil & Powder Co.,
Ltd.**, Kyoto (JP)

( * ) Notice: Subject to any disclaimer, the term of this patent is extended or adjusted under 35 U.S.C. 154(b) by 290 days.

(21) Appl. No.: 09/918,725

(22) Filed: Aug. 1, 2001

(65) Prior Publication Data

US 2002/0081482 A1 Jun. 27, 2002

Related U.S. Application Data

(63) Continuation-in-part of application No. 09/403,385, filed as application No. PCT/JP98/01802 on Apr. 20, 1998, now Pat. No. 6,440,599.

(30) Foreign Application Priority Data

Apr. 21, 1997 (JP) .............................................. 9/116008

(51) Int. Cl.$^7$ ........................... H01M 2/12; H01M 10/52
(52) U.S. Cl. ............................. 429/56; 429/57; 429/59
(58) Field of Search .............................. 429/53, 56, 57, 429/59

(56) References Cited

U.S. PATENT DOCUMENTS

| 3,219,488 | A | | 11/1965 | Southworth | |
| 5,279,907 | A | * | 1/1994 | Paterek et al. | 429/56 |
| 5,427,875 | A | | 6/1995 | Yamamoto et al. | |
| 5,609,972 | A | * | 3/1997 | Kaschmitter et al. | 429/56 |
| 5,631,100 | A | | 5/1997 | Yoshino et al. | |
| 5,741,606 | A | | 4/1998 | Mayer et al. | |
| 5,821,008 | A | * | 10/1998 | Harada et al. | 429/56 |

FOREIGN PATENT DOCUMENTS

| JP | 02284350 | 11/1990 |
| JP | 04349347 | 12/1992 |
| JP | 05314959 | 11/1993 |
| JP | 07105933 | 4/1995 |
| JP | 07211300 | 8/1995 |
| JP | 07254402 | 10/1995 |

OTHER PUBLICATIONS

Linden. Handbook of Batteries, $2^{nd}$ edition, pp. 1.3 and 14.49–14–50. 1995.*

* cited by examiner

Primary Examiner—Patrick Ryan
Assistant Examiner—Tracy Dove
(74) Attorney, Agent, or Firm—Browdy and Neimark, P.L.L.C.

(57) ABSTRACT

A closed battery which is capable of rapidly releasing the internal pressure there while simultaneously disconnecting the current to prevent the internal temperature of the battery from rising and causing the battery to explode. Thus, when the internal pressure of the closed battery is elevated due to a short circuit, overcharge, reverse charge, or the like, internal gas in the battery can be safely discharged and the battery prevented from bursting.

7 Claims, 4 Drawing Sheets

FIG. 6
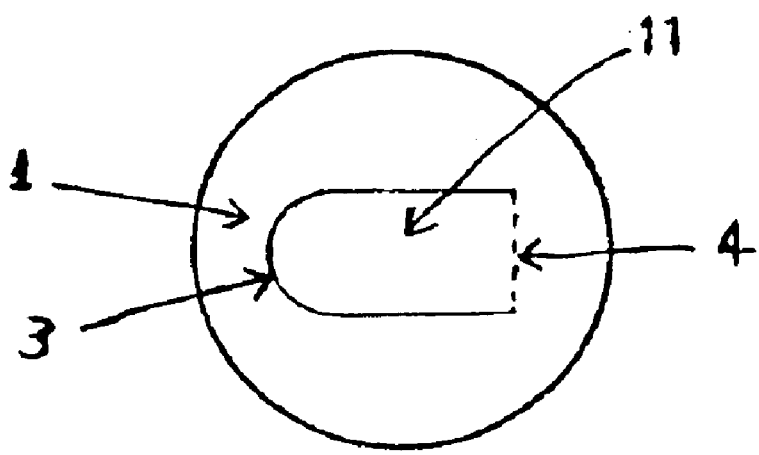
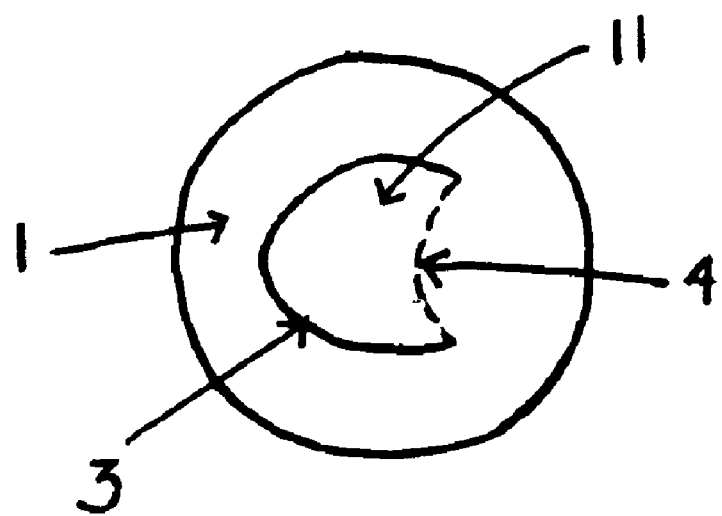
FIG. 7

CLOSED BATTERY

CROSS-REFERENCE TO RELATED APPLICATIONS

The present application is a continuation-in-part of Ser. No. 09/403,385, filed Jan. 6, 2000, now U.S. Pat. No. 6,440,599, which was the national stage under 35 U.S.C. 371 of PCT/JP98/01802, filed Apr. 20, 1998, the entire contents of which are hereby incorporated by reference.

FIELD OF THE INVENTION

The present invention relates to a closed battery which is capable of bursting at a predetermined pressure, particularly a low pressure, so as to release rapidly the internal pressure in the battery and at the same time to interrupt the current when the battery temperature or the battery internal pressure is elevated.

BACKGROUND OF THE INVENTION

Recently, with increasing requirements for electronic devices that are small and light in weight with high performance, non-aqueous batteries with high energy density have become popular. Batteries which use an alkali methal such as lithium, sodium, or potassium as an active material for the negative electrode thereof are used in a battery container with a completely closed structure, since the alkali metal readily reacts with water.

These completely closed batteries have the advantage or reasonable storability. However, the fact that they are well sealed sometimes causes the battery to rupture because of abnormally elevated internal temperatures; when a short circuit is formed inside or outside of the battery, causing a large flow of current; or hydrogen is generated in the battery because of water contamination during the manufacturing process thereof. In this case, the device that accommodates a rupturing battery will be damaged and, moreover, there may be a danger of the broken device and/or the battery harming the user. Accordingly, there is a need for a pressure releasing mechanism before the internal pressure of the battery is increased to such a degree that the battery ruptures.

So far, several methods for releasing the internal pressure of a battery have been proposed, and some of them have been used in practice. For instance, Japanese laid-open publication HEI 2-304861 discloses a safety valve for a battery which comprises a valve chest provided a part of a container of the battery and having a valve through hole which communicates with the inside of the battery and an outlet which communicates with the outside of the battery. The valve chest comprises a valve member, the surface of which opposed to the valve through hole is made of rubber, and an elastic member for pushing the above mentioned rubber surface of the valve member to the valve through hole. This safety valve maintains the sealability of the battery by closing the valve through hole with the rubber valve member, and prevents the internal pressure of the battery from rising in excess of a predetermined pressure by permitting the valve through hole to be opened when the internal pressure rises to the pressure prescribed for the elastic member.

Such a conventional safety valve has been widely used in Ni—Cd batteries. However, this type of safety valve has not yet been used in non-aqueous batteries which use alkali metals as the active material for the negative electrode, since, even if the elastic member presses the valve member to the valve through hole to close the battery, it is impossible to obtain the high sealability required for non-aqueous batteries.

One method for releasing the internal pressure of a battery which requires high sealability is disclosed in Japanese laid-open publication SHO 63-285859. In this method, a container of the battery is provided with a thinned portion in part of the wall thereof This thinned portion is formed by cold rolling a sheet of the container using a press device until the thickness of the rolled portion of the sheet is half the thickness of the initial thickness of the sheet. Thus, the battery is provided with good sealability with regard to this thinned wall portion because it is only transformed from a part of the continuous wall of the container.

Another pressure-releasing mechanism of this type is disclosed in Japanese laid-open publication HEI-6-215760. This releasing mechanism comprises a valve diaphragm fitted in an open end of the cylindrical container of a battery having a bottom and disposed above the electrode element of the battery, along with a lead for current cutoff disposed above the valve diaphragm. In this structure, when the internal pressure of the battery is elevated, the valve diaphragm expands to break the lead for current cutoff to interrupt the current flow.

According to the method disclosed in Japanese laid-open publication SHO-63-285859, it is necessary to obtain an extremely thin wall portion of the container so that the thinned portion can be ruptured at a relatively low pressure. However, when the wall portion is made too thin, fine or minute cracks may form during press-forming, thus impairing the sealability of the container.

Further, when metals are processed by cold working, their workability will be inevitably harder. Metal hardening does not always take place uniformly, and therefore, there arises a problem in that the operating pressure for such pressure releasing mechanisms cannot be controlled to the degree desirable to avoid damage. While half-etching has been proposed for thinning part of the wall of a battery container, it is extremely difficult to control the remaining thickness of the thinned portion after etching, and it is also difficult to obtain a satisfactory yield. Another problem is that the half-etched portion is not necessarily free from pinholes, and therefore, all of these products must be carefully inspected prior to use.

On the other hand, according to the method disclosed in Japanese laid-open publication HEI 6-215760, it is necessary to accurately control the depth of a cut off portion formed in the lead, which makes it difficult to form the cut off and interruption of the current is not reliable at a predetermined pressure.

SUMMARY OF THE INVENTION

In order to solve the above-mentioned problem, the present invention provides a closed battery which comprises an electrode element consisting of a positive electrode, a negative electrode, and a separator; an electrolyte; a battery container accommodating the electrode element together with the electrolyte; and a closing member fitted in the inner periphery of an open end portion of the battery container to close the open end portion of the battery container. The closing member consists of a metal substrate, a valve element provided in the metal substrate and defined by a break line so as to serve as a releasing chip such that when the internal pressure of the battery is elevated, the valve element is bent from a bending fulcrum so as to provide the metal substrate with an opening portion for releasing the internal pressure, and a metal foil which is adhered to the inner surface of the metal substrate.

According to the present invention, when the internal pressure of the battery is elevated because of a short circuit, overcharge, reverse charge, or the like, a valve chip, consisting of a metal substrate in which a valve element is provided for releasing the internal pressure of the battery, and a metal foil which has a uniform and accurate thickness, and is laid over the metal substrate so as to close a through hole which is usually closed with the valve element, operate to deform itself and push and raise the valve element up. When the internal pressure reaches a predetermined pressure, the metal foil stably and accurately bursts to cut the connection and at the same time discharge the internal gas within the battery, thereby preventing an abrupt rising of the internal temperature and possibly exploding the battery.

BRIEF DESCRIPTION OF THE DRAWINGS

FIG. 6 is a plan view showing still another embodiment of the valve chip according to the present invention.

FIG. 7 is a plan view showing yet another embodiment of the valve chip according to the present invention.

EXPLANATION OF REFERENCE CHARACTERS

Figure 1:
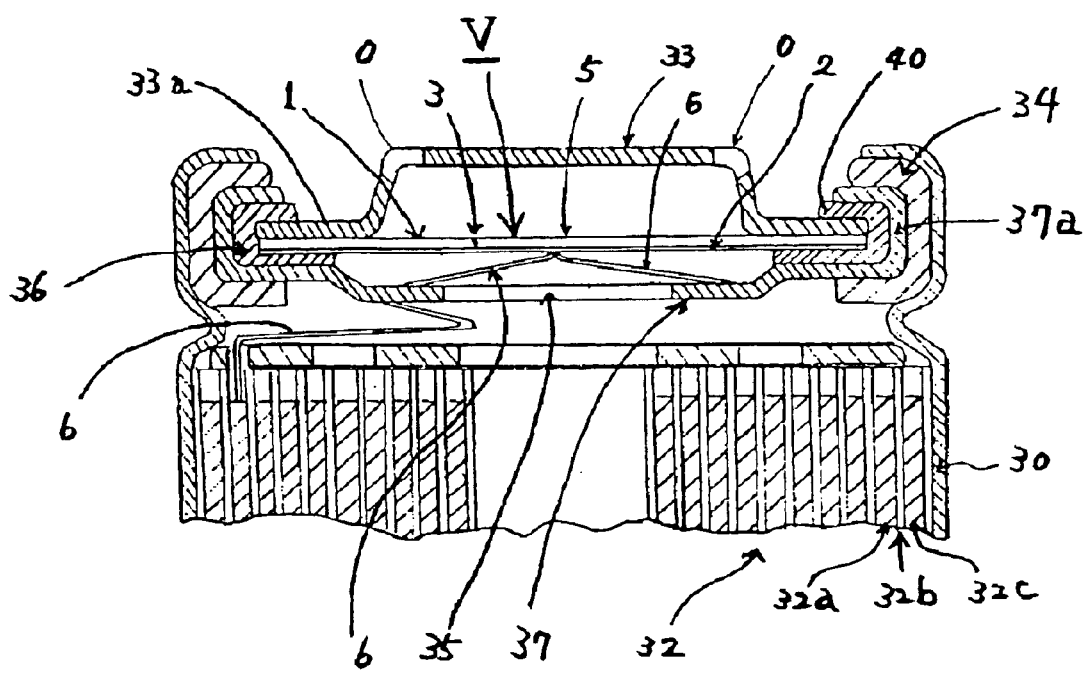
FIG. 1 is a vertical section view showing an upper part of the completely closed battery according to the present invention.

1: flexible metal substrate
2: metal foil
3: break line
4: bending fulcrum portion
5: circular valve element
6: lead wire
7: valve opening portion

DETAILED DESCRIPTION OF THE INVENTION

The present invention is now explained in conjunction with preferred embodiments and examples, referring to the drawings.

Figure 2:
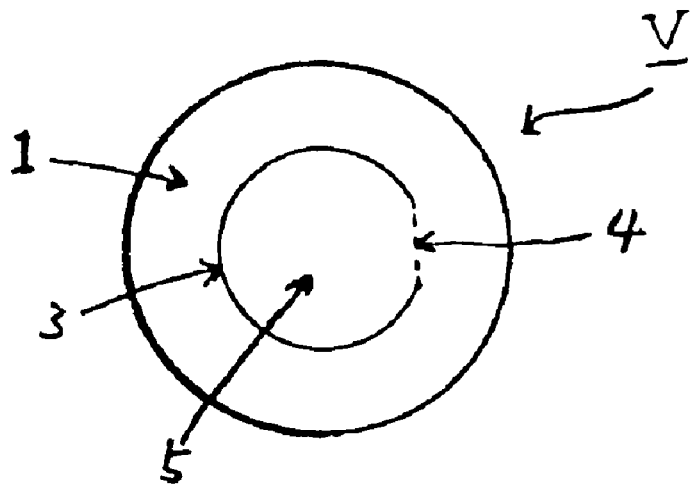
FIG. 2 is a plan view showing the valve chip according to the present invention.
Figure 3:
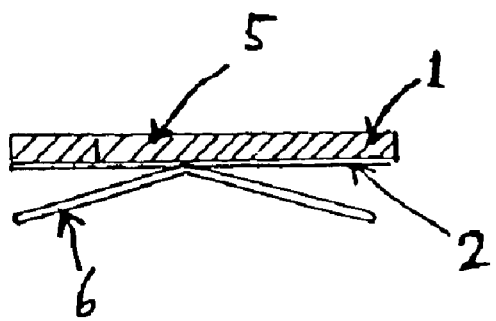
FIG. 3 is a vertical section view showing the valve chip according to the present invention.
Figure 4:
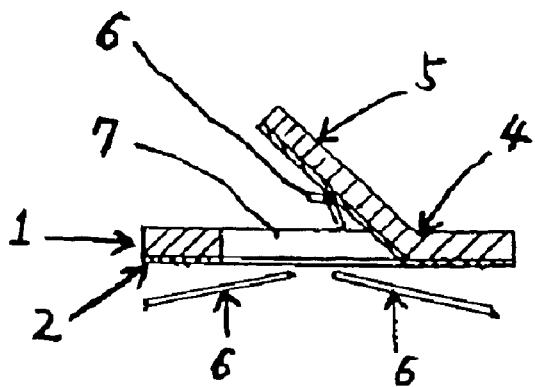
FIG. 4 is an explanatory view showing the operating manner of the valve chip in the case of abnormality.
Figure 5:
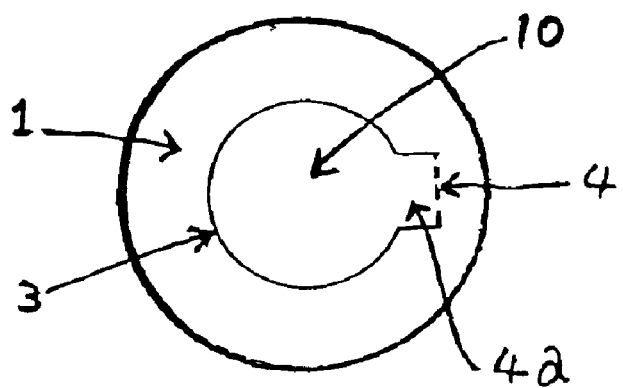
FIG. 5 is a plan view showing another embodiment of the valve chip according to the present invention.

FIG. 1 is a vertical section view showing an upper part of a completely closed battery of the present invention. FIG. 2 is a plan view showing a valve chip of the closed battery of the present invention. FIG. 3 is a vertical section view showing the above-mentioned valve chip. FIG. 4 is an explanatory view showing an operating manner of the valve chip in the case of abnormality. FIGS. 5 and 6 are plan views showing other embodiments of the valve chip.

In FIG. 1, a cylindrical battery container 30 having a bottom, which serves as a negative electrode terminal, accommodates an electrode element which is isolated from the outside 32 together with an electrolyte. The electrode element 32 is composed of a coiled laminate which comprises a positive electrode 32a, a separator 32b, and a negative electrode 32c disposed opposite to the positive electrode 32a via the separator 32b.

A closing cap 33, having through holes 0 and 0, serves as a rupture-preventing mechanism and at the same time as a positive electrode terminal. The closing cap 33 is fitted by caulking in the upper open end portion of the container 30 via an insulating gasket 34. Above the electrode element 32, a saucer-like inner cap 37 is disposed, and a gas release hole 35 of large diameter is provided at the center portion of the inner cap 37.

Between the inner cap 37 and the closing cap 33, a valve chip V is provided, which valve chip V forms a closing member for enclosing the electrode element. A periphery 36 of the valve chip V is in contact with a periphery 33a of the closing cap 33. These peripheries 36 and 33a are fixed by caulking in a circumference 37a of the inner cap 37 via an insulating gasket 40.

A lead wire 6 is attached by an appropriate means to an inner surface of the valve chip V serving as the closing member for closing the upper open end portion of the battery. The lead wire 6 extends to the positive electrode 32a of the electrode element 32.

As shown in FIG. 2, the valve chip V is substantially circular in plan view, and is composed for a metal substrate 1 having a circular form and a metal foil 2 adhered to the inner surface of the metal substrate 1. The metal substrate may be made of a metal selected from the group including steel sheet, stainless steel sheet, copper sheet, and aluminum sheet. The metal foil may be steel foil, stainless steel foil, copper foil, aluminum foil, nickel foil, or a nickel-iron alloy foil.

A substantially circular break line 3 is formed in the metal substrate 1 such that the break line completely penetrates the metal substrate 1 in the thickness direction, although the circular line partly leaves a non-break line portion which forms a bending fulcrum portion 4. The inner portion defined by the break line 3 is formed as a valve element 5 which operates as a pressure releasing chip for releasing the internal pressure of the battery when the internal pressure is elevated. When the valve element 5 is raised from bending the fulcrum portion 4, a valve opening portion 7 will be formed so as to release the internal pressure of the battery, as shown in FIG. 4. The lead wire is attached to the metal foil 2 by a suitable means such as brazing.

Next, the manner that the valve chip operates in the case of an abnormality is explaned. Once the internal pressure of the battery is elevated, the valve element 5 is raised up, as shown in FIG. 4, from the bending fulcrum portion 4 while breaking the metal foil 2 to form a valve opening portion 7 so that the internal pressure is released to the outside. The gas having increased pressure passes through the valve opening portion 7 and is discharged from the through hole 0 of the closing cap 33.

In this case, since the valve element 5 is raised up from the bending fulcrum portion 4, the lead wire 6 is disconnected as shown in FIG. 4. Alternatively, the brazed portion of the lead wire 6 to the metal foil 2 is detached, thereby interrupting the electrical connection.

The form of the valve element is not necessarily limited to the substantially circular form as shown in FIG. 2. FIG. 5 shows another embodiment of the valve element which is provided with an arm portion 4a at the bending fulcrum portion. FIG. 6 shows a valve element having a tongue-like form. FIG. 7 shows a valve element having a horseshoe like form.

In the completely closed battery of the present invention, when the internal pressure of the battery is elevated due to some abnormality, such as a short circuit, overcharge, or reverse charge, the metal foil 2 bursts at a predetermined pressure stably and accurately, particularly at relatively low pressures, to push up the circular valve element 5 from the bending fulcrum portion 4 formed on the flexible metal substrate, wherein the circular valve element 5 is provided in the flexible metal substrate 1 and defined by the break line 3 penetrating through the entire thickness of the metal substrate 1. As a result, the lead wire 6 is cut off, thereby disconnecting the electrical connection. As illustrated in FIG. 4, which shows the operating manner of the valve chip in a cross-sectional view, when the valve chip operates, it permits the valve opening portion 7 to be formed to release the internal gas pressure of the battery. Thus, the battery can be prevented from having an abrupt rising of the internal temperature or an explosion thereof.

The operating pressure for the valve chip can be controlled within a stable pressure range by selecting the material composition of the valve chip and adjusting the length of the bending fulcrum portion 4, because the l foil 1 can be manufactured with a high accuracy of thickness, on the order of one micron.

As mentioned above, according to the present invention, when the internal pressure of a battery is elevated due to short circuit, overcharge, reverse charge, or the like, and it reaches a predetermined pressure, the valve chip operates to permit the metal foil to burst stably and accurately even at a relatively low pressure, so as to release the internal gas from the battery. Thus, the battery can be prevented from abrupt temperature increase or explosion.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

What is claimed is:

1. A closed battery comprising:
   an electrode element consisting of a positive electrode, a negative electrode, and a separator;
   an electrolyte;
   a battery container accommodating the electrode element together with said electrolyte; and
   a closing member fitted in the inner periphery of an open end portion of said battery container to close the open end portion of the battery container;
   wherein said closing member consists of a metal substrate, a valve element which is provided in said metal substrate and defined by a break line so as to serve as a releasing chip such that when the internal pressure of the battery is elevated, the valve element is bent from a bending fulcrum which does not have a break line so as to provide the metal substrate with an opening portion for releasing the internal pressure, and a metal foil which is adhered to the inner surface of the metal substrate; and
   wherein said metal foil is connected to a lead member for conducting a current from said electrode element to a closing cap, and when said valve element operates to release internal pressure in the battery, said lead member is electrically disconnected from the metal foil to interrupt the current.

2. The closed battery according to claim 1 wherein said valve element has a substantially circular form, a part of which is a bending fulcrum portion.

3. The closed battery according to claim 1 wherein said valve element has a substantially tongue-like form.

4. The closed battery according to claim 1 wherein said metal substrate is made of a material selected from the group consisting of steel sheet, stainless steel sheet, copper sheet, and aluminum sheet.

5. The closed battery according to claim 1 wherein said metal foil is made of a material selected from the group consisting of steel foil, stainless steel foil, copper foil, aluminum foil, nickel foil, and nickel-iron alloy foil.

6. The closed battery according to claim 1 wherein said break line penetrates the entire thickness of said metal substrate.

7. The closed battery according to claim 1 wherein said valve element has a substantially horseshoe form.

* * * * *